(Model.)  2 Sheets—Sheet 1.

J. S. SIMPSON.
COMBINED FISH AND ANIMAL TRAP.

No. 244,150.  Patented July 12, 1881.

Witnesses:  Inventor:
Fred. G. Dieterich  John S. Simpson,
J. R. Littell  by C. A. Snow & Co.
  Attys.

(Model.) 2 Sheets—Sheet 2.
J. S. SIMPSON.
COMBINED FISH AND ANIMAL TRAP.
No. 244,150. Patented July 12, 1881.
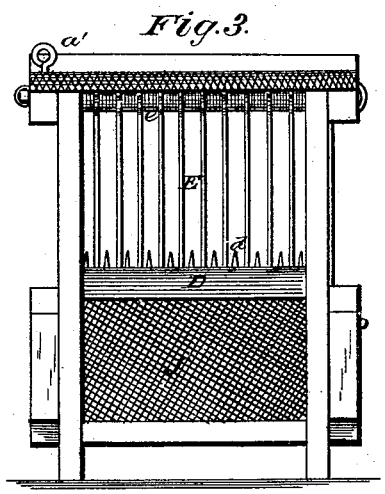
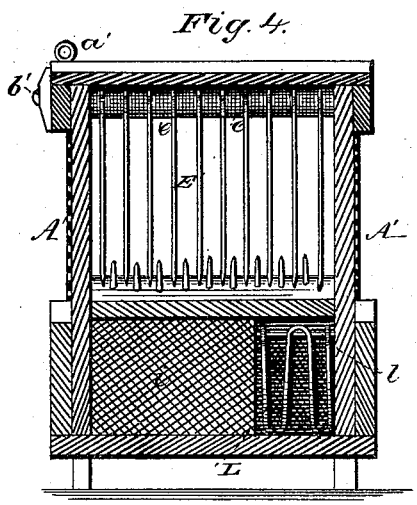
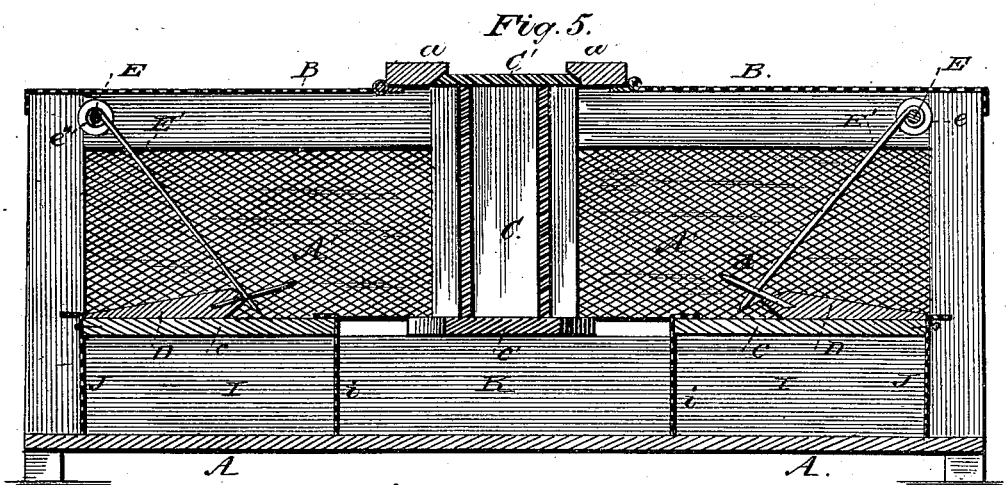
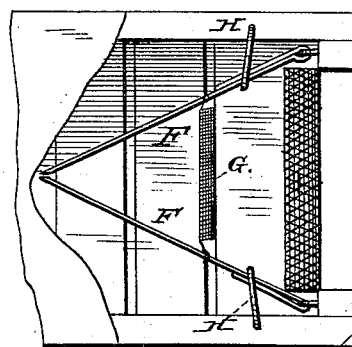
Witnesses:
Fred. G. Dieterich
J. R. Littell
Inventor:
J. S. Simpson
by C. A. Snow & Co.
Attys

UNITED STATES PATENT OFFICE.

JOHN S. SIMPSON, OF NASHVILLE, TENNESSEE.

COMBINED FISH AND ANIMAL TRAP.

SPECIFICATION forming part of Letters Patent No. 244,150, dated July 12, 1881.

Application filed November 24, 1880. (Model.)

*To all whom it may concern:*

Be it known that I, JOHN S. SIMPSON, of Nashville, in the county of Davidson and State of Tennessee, have invented certain new and useful Improvements in Combined Fish and Animal Traps; and I do hereby declare that the following is a full, clear, and exact description of the invention, which will enable others skilled in the art to which it appertains to make and use the same, reference being had to the accompanying drawings, which form a part of this specification.

This invention relates to combined fish and animal traps; and it consists in providing such traps with compartments so arranged that the trap may be readily adjusted for use either as a fish or animal trap, as hereinafter more fully described and claimed.

Figure 1:
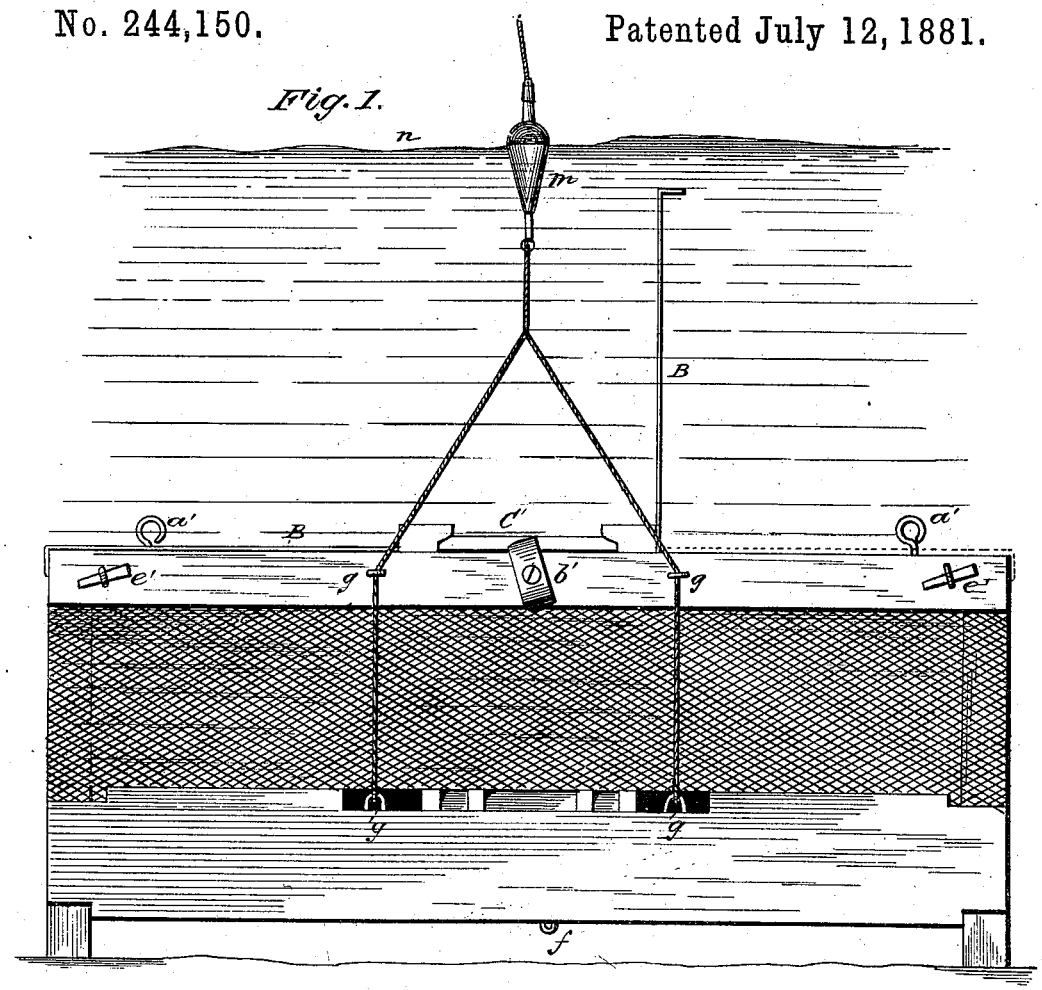
Figure 2:
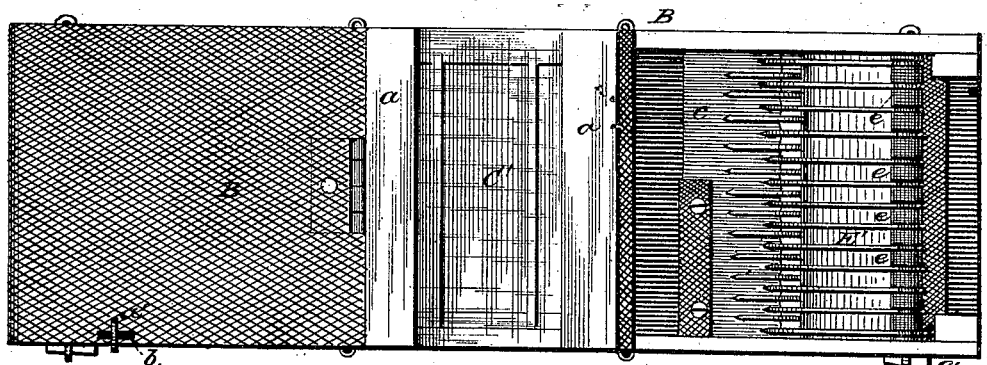

In the annexed drawings, in which corresponding parts are indicated by like letters in the several views, Figure 1 represents a side view of my improved trap, with the lids or covers partly raised. Fig. 2 is a top-plan view of the same with the lids removed. Fig. 3 is an end view; Fig. 4, a vertical cross-section; Fig. 5, a vertical longitudinal section, and Fig. 6 a detail view, showing a modified form of spring-gate.

The trap A may be made of any suitable form or material, but is preferably constructed of wire or perforated metal, and in the general oblong form shown in the drawings. Its capacity will depend, of course, upon the number and size of the fish or animals to be trapped. The box A is provided with a suitable bottom, either solid or perforated, and with perforated sides, A' A', supporting the grooved cross-pieces $a$ $a$, to the outer sides of which are hinged the covers or lids B B. These covers are provided with slots $b$ $b$, through which pass the buttons or pivoted staples $a'$ $a'$, when the lids are closed, and by turning which the lids are held securely in place. Any other appropriate fastening may, however, be employed.

At each end of the trap, between the sides, A' A', and at a suitable distance from the bottom of the trap, are placed shelves $c$ $c$. A similar shelf, $c'$, is also secured in like manner at the center of the trap, for the purpose of supporting the glass sides of the bait-box C, of which box the shelf $c'$ forms the bottom. The glass sides run in grooves on the inner sides of the side pieces, A' A', so as to be easily removed, when desired. The bait-box C is provided with a sliding cover, C', which is also composed of glass, and is slightly wedge-shaped or beveled at its sides, so as to fit readily into the inner grooved sides of the cross-pieces $a$ $a$, to close the top of the box C, where it is held in place by means of the button $b'$.

To the upper surface of each end shelf, $c$, is secured a plate, D, which extends between the sides of the trap, and is provided on its inner edge with a series of sharp-pointed blades or prongs, $d$, that extend upward and inward at a slight angle to a point above the inner edge of the shelf $c$.

Above the outer edge of the plate D, and suspended from a transverse rod or shaft, E, that passes across each end of the trap, immediately below the outer ends of the lids B, is a spring-gate composed of the rods or prongs E', which are pivoted separately to the shaft or rod E by means of rings or eyes $e''$ in the upper ends of each, so that one or more may be moved by an animal from the outside without lifting the weight of all. These rods E', which may have sharp inner edges, if desired, pass obliquely to the prongs $d$, between which they rest, and thus prevent exit from the trap, while permitting entrance thereto. On the shaft E, between the rings or eyes $e''$ of the pronged rods E', are arranged spring-coils $e$, Fig. 2; and the shaft being provided at its outer ends with screw-threads and nuts, or with a loop, through which passes a wedge, $e'$, as shown in the drawings, the tension of the rods E' and their distance apart may be readily adjusted.

In Fig. 6 is shown another form of gate, in which the pronged plate D is dispensed with. Two gates, F F, composed of sharp-pointed horizontal rods, are arranged to swing vertically on each side of the trap, so as to open inward, and are connected above by a spiral spring, G, that draws them together and closes the end of the trap, except when pressure is made against the gates from the outside. When closed the gates F F press against the posts or standards H H, which prevents the spring G from drawing them more closely together.

Either form of gate may be used, according to circumstances; but that first described will be usually found most desirable, especially when trapping fish or animals of the smaller kinds, as entrance to the trap may be thus effected with greater ease and without the necessity of the animal moving the entire gate.

Under each shelf $c$ a compartment or chamber, I, is formed by the partitions $i\ i$, which are detachably secured to the inner edge of the shelf $c$, so as to be easily removed when desired. These compartments I I are closed at each end of the trap by doors J J, which may be hinged or made to slide up and down, as desired, and are provided with suitable fastenings. The chambers I I communicate with the central compartment, K, or with that part of the trap under the shelf $c'$, by means of openings at the side, which are closed by the gates L L. These gates hang from rods $l\ l$, that are supported by the partitions $i\ i$ and sides of the trap-frame, and are so arranged as to be capable of being withdrawn when it is desired to remove the gates L L and partitions $i\ i$, for the purpose of changing the apparatus from an animal-trap to a fish-trap. The gates L L are preferably formed of a wire bent into parallel bars in the form shown in the drawings, and are suspended from the rods $l\ l$ by means of rings or hooks at each end, so as to open inward toward the chambers I I. They may be provided with sharp points at their inner and lower ends, if desired.

The lower part of the trap is provided with staples $f\ f$, to which weights may be attached when it is desired to sink the trap under water. Similar staples $g\ g$ are also secured to the sides of the trap at convenient points, for attaching lines to raise and lower the trap, its position in the water being indicated by a float, $m$, on the line $n$.

From the foregoing description the operation of the trap will be readily understood.

When used as an animal-trap live bait, such as a bird or a chicken, may be placed in the glass bait-box C, which is sufficiently perforated to admit the necessary quantity of air to support life. Animals attracted by the bait are able to enter the trap by pressing against the gates E' E', the bars or rods of which open inward to allow their entrance, but immediately after fall and prevent their escape. On entering the trap the animal will pass between the shelves $c\ c'$ to the lower floor or compartment, K, and may enter, by pressing against the gates L L, into either one of the chambers I I, from which he is unable to escape, but may be removed, when desired, by opening the door J.

When employed as a fish-trap, the compartments I I K may be thrown into one, if desired, by removing the gates L L, which is effected by withdrawing the rods $l\ l$ and by detaching the screws that hold the partitions $i\ i$ to the shelves $c\ c$ and then withdrawing the partitions through the top of the trap. The bait-box C being supplied with live minnows or other suitable bait, the trap may be lowered by means of cords to the desired location under water, and will operate in a similar manner to that above described.

The trap is simple, durable, and effective, and will be found of great convenience when used for the purposes for which it is designed.

Having thus described my invention, what I claim as new, and desire to secure by Letters Patent, is—

1. In a fish and animal trap, the combination, with the plate D, having projecting prongs $d$, of the separate sharp-pointed blades or prongs E', suspended from the laterally-adjustable shaft E in an inclined position, and the intermediate spring-coils $e$, also mounted on said shaft E, substantially as and for the purpose set forth.

2. In a fish and animal trap, the combination, with the side frame, A' A', and shelves $c\ c$, of the removable partitions $i\ i$, rods $l\ l$, and gates L L, substantially as and for the purpose specified.

3. In a fish and animal trap, the combination, with the side frame, A' A', and end inlet-doors, of the shelves $c\ c\ c'$, central glass bait-box, C, and compartments I I K, provided with suitable doors or gates, substantially as set forth.

4. A combined fish and animal trap having perforated sides A' A', perforated lids B B, transparent bait-box C, inwardly-swinging gates composed of separately-pivoted rods E', and compartments I I K, provided with removable partitions $i\ i$, gates L L, and doors J J, all constructed and arranged substantially as shown and described.

In testimony that I claim the foregoing as my own I have hereto affixed my signature in presence of two witnesses.

JOHN STETSON SIMPSON.

Witnesses:
ROBERT ANDERSON BALLOWE,
CHARLES ALFRED DeSAUSSURE.